United States Patent
Anway et al.

(10) Patent No.: US 8,878,941 B2
(45) Date of Patent: Nov. 4, 2014

(54) METHOD AND APPARATUS FOR TESTING A VIDEO PROCESSING SYSTEM

(75) Inventors: Paul E. Anway, Chilhowee, MO (US); Dexter A. Schnebly, Wichita, KS (US)

(73) Assignee: The Boeing Company, Chicago, IL (US)

( * ) Notice: Subject to any disclaimer, the term of this patent is extended or adjusted under 35 U.S.C. 154(b) by 1781 days.

(21) Appl. No.: 12/142,538

(22) Filed: Jun. 19, 2008

(65) Prior Publication Data

US 2009/0316001 A1    Dec. 24, 2009

(51) Int. Cl.
*H04N 17/00* (2006.01)
*H04N 17/02* (2006.01)
*H04N 7/18* (2006.01)

(52) U.S. Cl.
CPC ............ *H04N 7/183* (2013.01); *H04N 17/004* (2013.01)
USPC ......................................... 348/180

(58) Field of Classification Search
CPC ....... H04N 7/18; H04N 7/183; H04N 17/002; H04N 17/004
USPC ............... 725/75, 19; 345/157, 810; 348/180, 348/181, 143, 117; 382/280; 463/1
See application file for complete search history.

(56) References Cited

U.S. PATENT DOCUMENTS

| | | | | |
|---|---|---|---|---|
| 4,631,691 A * | 12/1986 | Pica | | 382/280 |
| 5,714,977 A * | 2/1998 | Mc Neil | | 345/157 |
| 6,279,906 B1 * | 8/2001 | Sanderson et al. | | 273/148 B |
| 6,651,933 B1 | 11/2003 | von Thal et al. | | |
| 6,752,357 B2 | 6/2004 | Thal et al. | | |
| 6,837,462 B2 | 1/2005 | von Thal et al. | | |
| 7,309,048 B2 | 12/2007 | von Thal et al. | | |
| 7,315,656 B2 | 1/2008 | Von Thal et al. | | |
| 7,525,910 B2 * | 4/2009 | Wen | | 370/230 |
| 2001/0053712 A1 * | 12/2001 | Yoseloff et al. | | 463/1 |
| 2002/0163657 A1 * | 11/2002 | Bogdanowicz et al. | | 358/1.9 |
| 2003/0098888 A1 * | 5/2003 | Guenther et al. | | 345/810 |
| 2003/0148811 A1 * | 8/2003 | Sitrick | | 463/31 |
| 2004/0237111 A1 * | 11/2004 | Iraclianos et al. | | 725/75 |
| 2007/0107034 A1 * | 5/2007 | Gotwals | | 725/129 |
| 2007/0201171 A1 * | 8/2007 | Kanekawa et al. | | 361/42 |
| 2009/0228224 A1 * | 9/2009 | Spanier et al. | | 702/60 |
| 2010/0056956 A1 * | 3/2010 | Dufresne et al. | | 600/586 |

OTHER PUBLICATIONS

Search Report of GB0910576.8; Sep. 30, 2009; 3 pages.
VideoTek PTM-305; Harris Assured Communications; http://www.broadcast.harris.com; 2006.
E-TPG8 Advanced Test pattern Generator; http://www.eaglecctv.co.za; Dec. 14, 2004; pp. 106-107.
XTM020 Site Survey and Test Monitor; http://www.x-vision.com.uk; May 12, 2008.

* cited by examiner

*Primary Examiner* — Nasser Goodarzi
*Assistant Examiner* — An Nguyen
(74) *Attorney, Agent, or Firm* — Armstrong Teasdale LLP

(57) ABSTRACT

A method of testing an aircraft video system using a handheld video testing apparatus is described. The aircraft video system includes a video processing system and at least one display. The method includes generating a digital test image utilizing the video testing apparatus, receiving the digital test image at the video processing system, forwarding the digital test image to at least one of the displays through operation of the video processing system, and verifying the digital test image is correctly produced by the displays to which the digital test image was forwarded.

23 Claims, 6 Drawing Sheets

METHOD AND APPARATUS FOR TESTING A VIDEO PROCESSING SYSTEM

BACKGROUND OF THE INVENTION

The field of the invention relates generally to testing of video processing systems, and more particularly, to a system and apparatus for testing a video processing system used in an aircraft.

Video cameras and video processing systems are used in aircraft to provide video images to a user of various areas of the aircraft. These systems are especially useful in large aircraft flown with minimal crews. For example, in a cargo aircraft, video cameras may be positioned such that a crew in the cockpit of the aircraft can monitor the cargo area of the aircraft. In another example, video cameras may be positioned to aid an in-flight refueling process performed by a tanker aircraft.

Typically, one or more video cameras are coupled to a video processing system, which receives images from the cameras and displays the images on a monitor for viewing. Currently, in order to test the functionality of a video processing system, the aircraft must be "powered-up" to a point where the video equipment generates images on a monitor. If images do not appear, often the video processing system must be removed from its position within the aircraft in order to perform troubleshooting tests to determine the reason that the video processing system is not functioning, or at least verify that it is not the cause of the malfunction. Such tests may require multiple people through out the aircraft and also may require at least some educated guesswork.

BRIEF DESCRIPTION OF THE INVENTION

In one aspect, a method of testing an aircraft video system using a handheld video testing apparatus is described. The aircraft video system includes a video processing system and at least one display. The method includes generating a digital test image utilizing the video testing apparatus, receiving the digital test image at the video processing system, forwarding the digital test image to at least one of the displays through operation of the video processing system, and verifying the digital test image is correctly produced by the displays to which the digital test image was forwarded.

In another aspect, an apparatus for testing a video processing system is provided. The video processing system is coupled to at least one display screen and facilitates display of a test image on the at least one display. The apparatus includes an interface adapter configured to facilitate coupling of the video testing apparatus and the video processing system, and a processor configured to provide a plurality of test images to said interface adapter.

DETAILED DESCRIPTION OF THE INVENTION

This invention relates generally to video systems and more particularly, to methods and apparatus for testing a Video Processing System (VPS). One exemplary embodiment that will be used as a familiar, but non-exclusive example, relates to an aircraft that includes a VPS that controls a plurality of cameras as well as provides digital video images from one or more of the cameras to a display. The text will often describe fight deck display systems, however, the system is equally applicable to a variety of vehicles, such as, but not limited to, locomotives, automobiles, maritime and sub-mariner applications, and extra-terrestrial applications.

Figure 1:
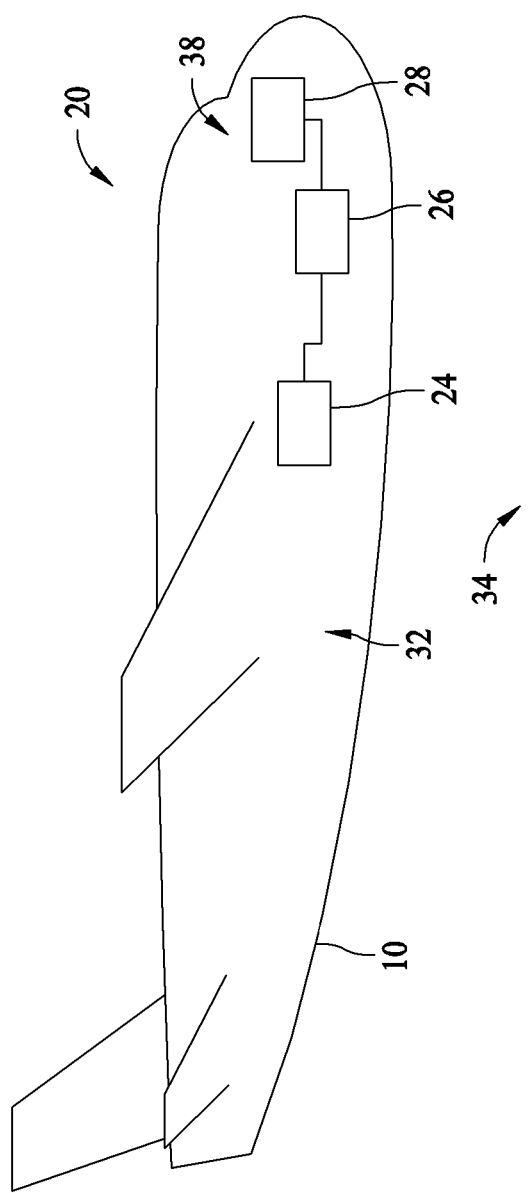
FIG. 1 illustrates an aircraft that includes an aircraft video system.

FIG. 1 illustrates an exemplary aircraft 10 that includes an aircraft video system 20. In the exemplary embodiment, aircraft video system 20 includes a camera 24, a VPS 26, and a display device 28. Camera 24, VPS 26, and display device 28 are coupled, either wirelessly, or by fiber, wires, and/or cables, to transmit at least one of an image signal and an operational command between camera 24, VPS 26, and display device 28. In the exemplary embodiment, camera 24 is positioned in a cargo storage area of aircraft 10, however, camera 24 may be positioned anywhere in an interior 32 of aircraft 10 and/or on an exterior 34 of aircraft 10 that enable aircraft video system 20 to function as described herein. Furthermore, camera 24 is configured to be movable, for example using motors (not shown in FIG. 1), at the direction of a user. In the exemplary embodiment, display device 28 is positioned in a cockpit 38 of aircraft 10, which allows an operator of aircraft 10 to view video captured by camera 24. However, display device 28 may be positioned anywhere in interior 32 or exterior 34 of aircraft 10 that enables aircraft video system 20 to function as described herein. Furthermore, in various alternative embodiments, aircraft video system 20 may include a plurality of cameras 24, VPSs 26, and/or display devices 28. Display device 28 may be a multifunctional display device not limited to the display of signals received from VPS 26. Also, display device 28 may have input capabilities allowing a user to control operation of VPS 26.

Figure 2:
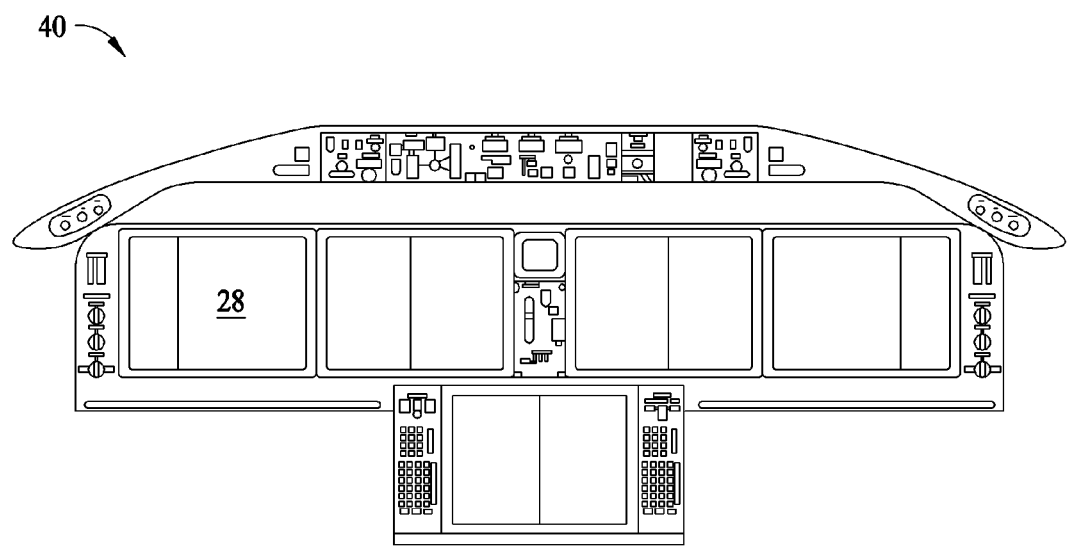
FIG. 2 is a front view of an aircraft cockpit display panel that includes at least one display screen.

FIG. 2 is a forward perspective view of an exemplary aircraft cockpit display panel 40 that includes at least one display device 28. Display device 28 may include, for example, but is not limited to including, a cathode ray tube (CRT) display, a liquid crystal display (LCD), or plasma screen technology, however, any display device capable of displaying an image in response to a digital signal may be used. Display device 28 will be referred to herein as display screen 28. In the exemplary embodiment, display screen 28 is positioned on aircraft cockpit display panel 40. In an alternative embodiment, display screen 28 is positioned on an auxiliary panel (not shown in FIG. 2) located in the cockpit or positioned elsewhere within the aircraft. In another alternative embodiment, display screen 28 is part of a mobile device that may be viewed anywhere. During aircraft operation, display screen 28 is available for viewing by an occupant and/or a crew member of the aircraft.

Figure 3:
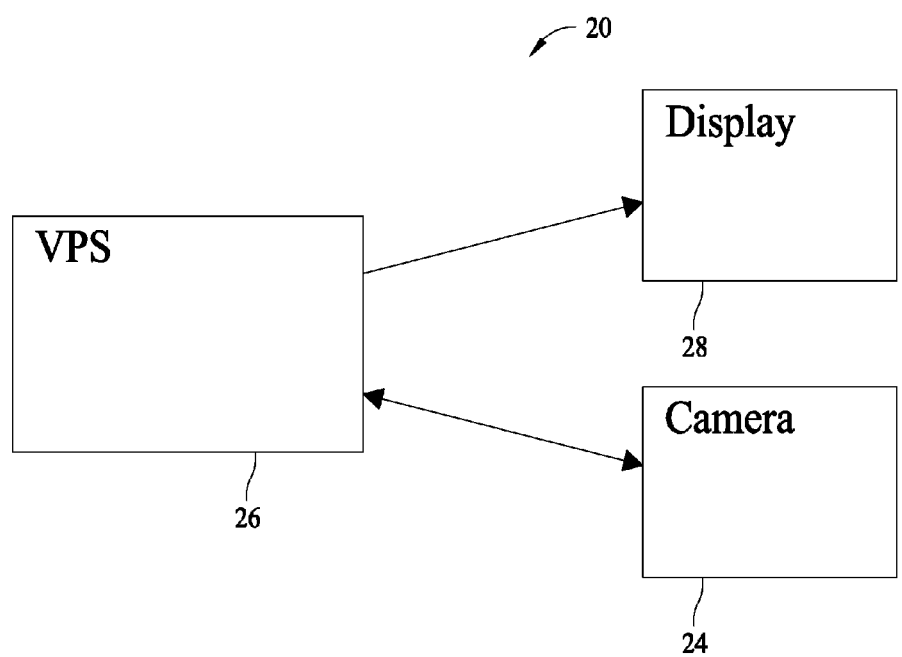
FIG. 3 is a block diagram of an exemplary aircraft video system.

FIG. 3 is a block diagram of exemplary aircraft video system 20. In the exemplary embodiment, aircraft video system 20 includes a video camera 24, a VPS 26 and a display screen 28. Camera 24 is communicatively coupled to VPS 26. VPS 26 provides camera 24 with directional commands that cause camera 24 to move according to user commands. Camera 24 provides VPS 26 with digital video images collected by camera 24. VPS 26 processes the digital video images collected by camera 24 and provides digital video signals to display screen 28. Image data processed by VPS 26 may be provided in any format to one or more display devices as appropriate.

Figure 4:
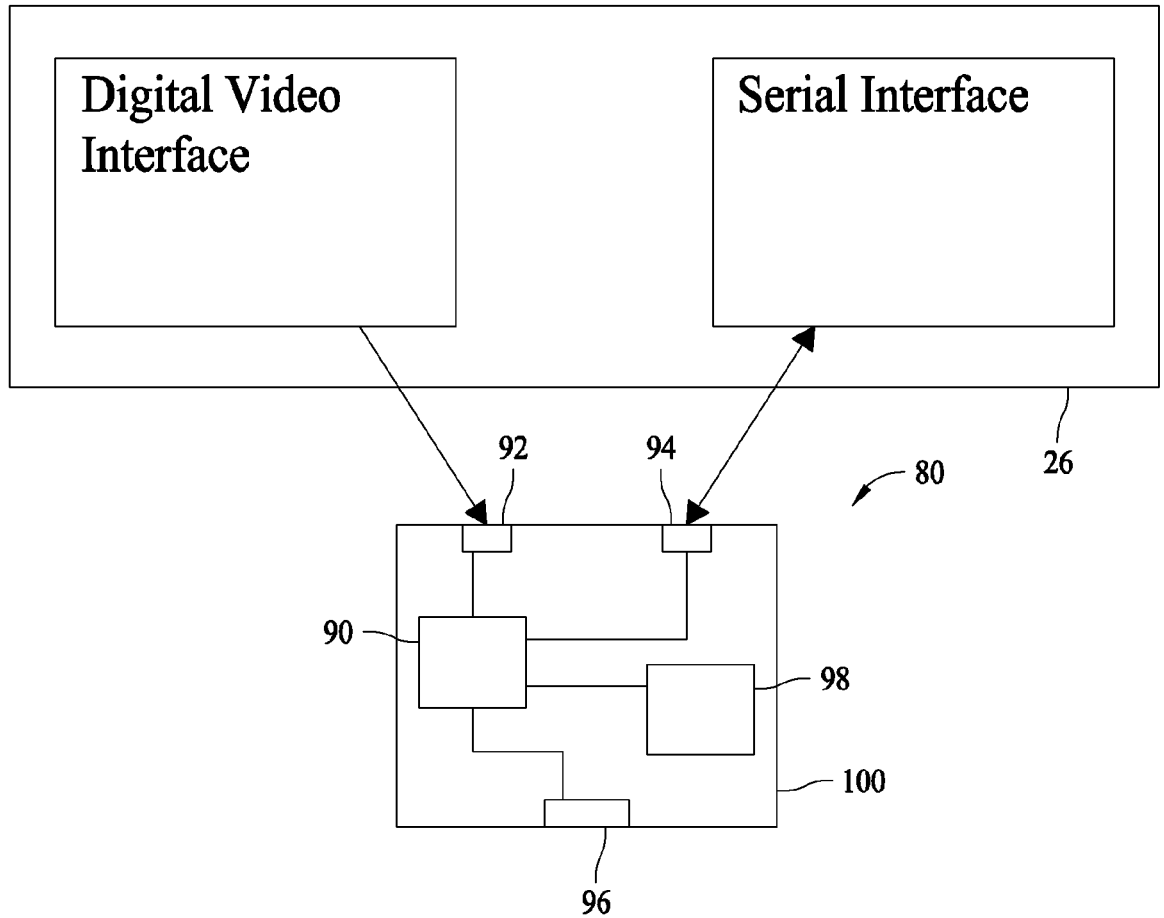
FIG. 4 is a block diagram of an exemplary video testing apparatus for testing of a video processing system (VPS).

FIG. 4 is a block diagram of an exemplary video testing apparatus 80 for testing VPS 26. In the exemplary embodiment, video testing apparatus 80 includes a processor 90, a digital video interface 92, a serial interface 94, a diagnostic input port 96, and at least one input device 98. In the exemplary embodiment, processor 90, digital video interface 92, serial interface 94, diagnostic input port 96, and at least one input device 98 are held on and/or within a housing 100. In the exemplary embodiment, processor 90 is a field-programmable gate array (FPGA), however, processor 90 may be any programmable device that allows video testing apparatus 80 to function as described herein. In the exemplary embodiment, video testing apparatus 80 is a handheld device. The handheld sizing eases transport of video testing apparatus 80 to locations where VPS 26 testing is desired.

Processor 90 is coupled to digital video interface 92, serial interface 94, diagnostic input port 96, and the at least one input device 98. In the exemplary embodiment, processor 90 generates a plurality of digital images and provides the images to digital video interface 92. In the exemplary embodiment, the plurality of digital images are a combination of known video test patterns and images that, when displayed, allow a user to determine if VPS 26 is functioning as desired. The digital images may be fixed test patterns, or a plurality of slowly changing test patterns. The digital images are designed to be easily recognized by a user so the user is able to determine if VPS 26 is functioning properly.

Processor 90 generates the plurality of digital images in a predetermined video format that matches the video format output by camera 24 (shown in FIG. 3). In the exemplary embodiment, digital images are transmitted using a low voltage differential signaling (LVDS) video standard. Digital video interface 92 includes a connector that enables coupling of the video testing apparatus 80 and VPS 26 being tested. In the exemplary embodiment, digital video interface 92 includes a sixty-eight pin ultrawide small computer system interface (SCSI) connector.

As stated above, serial interface 94 is coupled to processor 90. In the exemplary embodiment, serial interface 94 provides a camera control interface that emulates camera functions such as camera motion. During normal operation of aircraft video system 20 (shown in FIG. 3), VPS 26 provides motion signals to camera 24. The motion signals may be pre-programmed to facilitate a predetermined series of camera movements, and/or may be provided by a user through an input to VPS 26 (not shown in FIG. 3). During a test of VPS 26 operation, video testing apparatus 80 receives motion commands from VPS 26 and generates digital video images that allow a user to observe if VPS 26 is properly processing motion commands. In an exemplary embodiment, serial interface 94 uses a Recommended Standard 232 (RS-232) interface.

Processor 90 is also coupled to at least one input device 98. The at least one input device 98 may be a touch screen, a rotary dial, a set of switches, a set of push-buttons, or any other input device that enables video testing apparatus 80 to function as described herein. The at least one input device 98 allows a user to, among other things, instruct processor 90 to start a test image sequence, stop a test image sequence, and adjust the location of the test video image on display screen 28 (shown in FIG. 3). The at least one input device 98 also allows a user to select the image generated by processor 90, and/or select the sequence of test patterns desired.

Processor 90 is also coupled to diagnostic input port 96. In the exemplary embodiment, diagnostic input port 96 is a Universal Serial Bus (USB) port. A computer (not shown in FIG. 4), for example, may be coupled to processor 90 through diagnostic input port 96. The computer may re-program processor 90, or update the software stored in processor 90.

Figure 5:
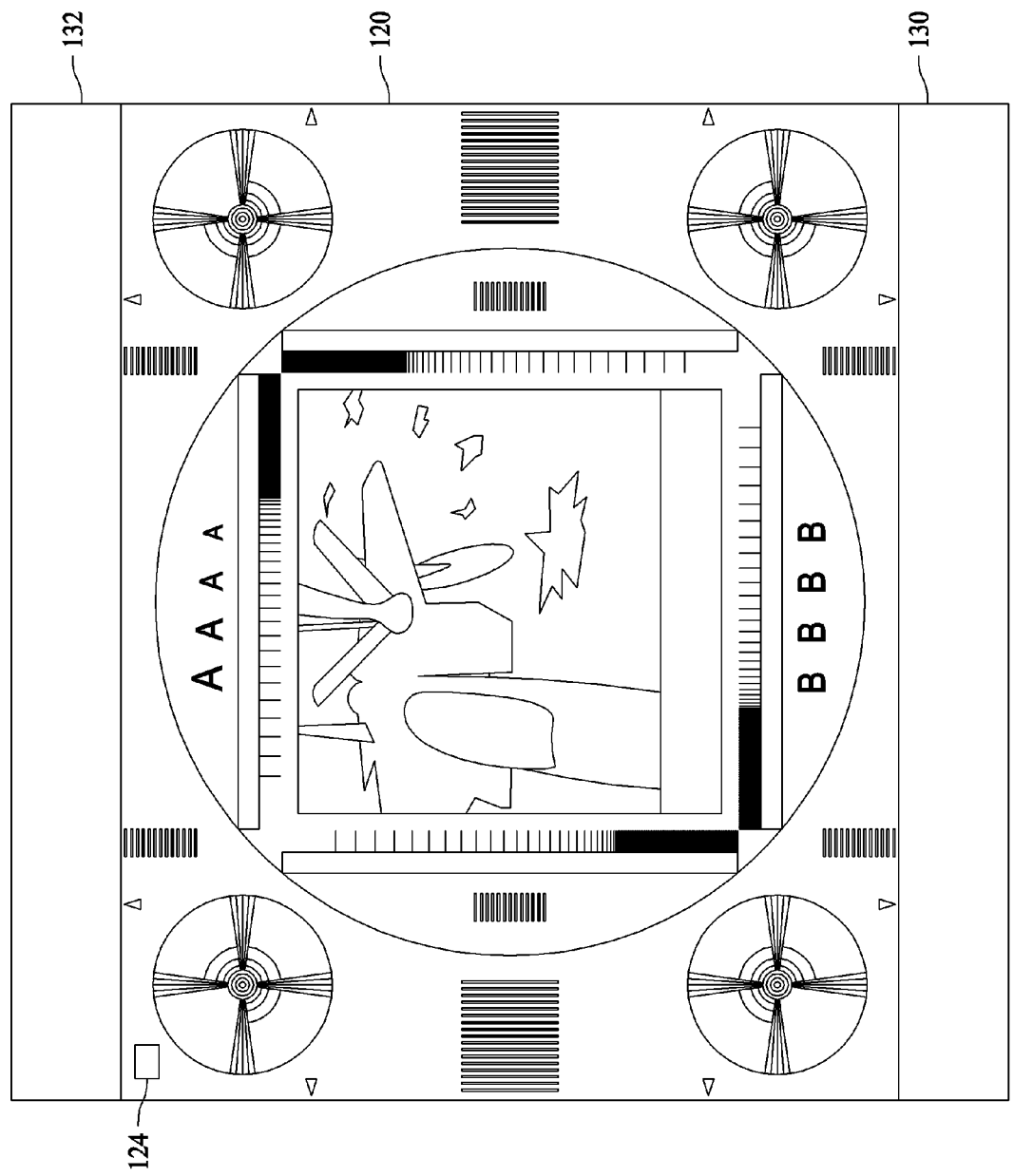
FIG. 5 is one example of an image capable of being produced by the apparatus shown in FIG. 4.

FIG. 5 is an exemplary image 120 produced by video testing apparatus 80. Image 120 is a still image provided to VPS 26 (shown in FIG. 3) as a substitute to an image that might be viewed and produced by camera 24 (shown in FIG. 3). In the exemplary embodiment, image 120 is a known video pattern that corresponds to an image produced by a commercial/military quality video camera. By producing a test image in video testing apparatus 80, the functionality of VPS 26 can be tested without concern as to the functionality of camera 24. Furthermore, by producing a test image in video testing apparatus 80, the functionality of VPS 26 can be tested before being installed in an aircraft. By not requiring an aircraft or camera system to test VPS 26, video testing apparatus 80 may also be used during software development.

Although video testing apparatus 80 produces a still image and camera 24 produces a moving video feed, the ability of VPS 26 to handle motion can also be tested using video testing apparatus 80. In the exemplary embodiment, processor 90 generates a plurality of images, for example image 120. Another of the plurality of images (not shown in FIG. 5) may be substantially similar to image 120, but be shifted in at least one direction. Additionally, another of the plurality of images may be shifted yet again. The shifting of the still images by processor 90 simulates motion and allows a user to test the ability of VPS 26 to handle motion. In an alternative embodiment, video testing apparatus 80 simulates motion by panning and/or zooming across a single still image.

In an exemplary embodiment, video testing apparatus 80 also generates a frame counter 124. Frame counter 124 changes as a new test image is displayed. In one specific embodiment, frame counter 124 is a twelve bit counter, wherein each change of the frame counter indicates a change in the image displayed. Frame counter 124 provides a numerical description of each image, allowing a user to identify a specific image for future reference.

In an exemplary embodiment, the image generated by processor 90 is 1024 pixels by 1024 pixels. However, in an exemplary embodiment, display screen 28 (shown in FIG. 3) is sized to display images that are 1024 pixels by 768 pixels. Processor 90 is also configured to display a changing shade of grey in areas 130 and 132, such that the 1024 pixel by 768 pixel image is properly displayed on display screen 28. Areas 130 and 132 are the portions of display screen 28 not used to display image 120. In the exemplary embodiment, a user may select, for example, using inputs 98, a vertical location of image 120 within display screen 28. Furthermore, in an exemplary embodiment, the shade of gray displayed in areas 130 and 132 may change when the image displayed is changed. The change in the shade of gray, in addition to frame counter 124, accentuate the display of a new image.

Figure 6:
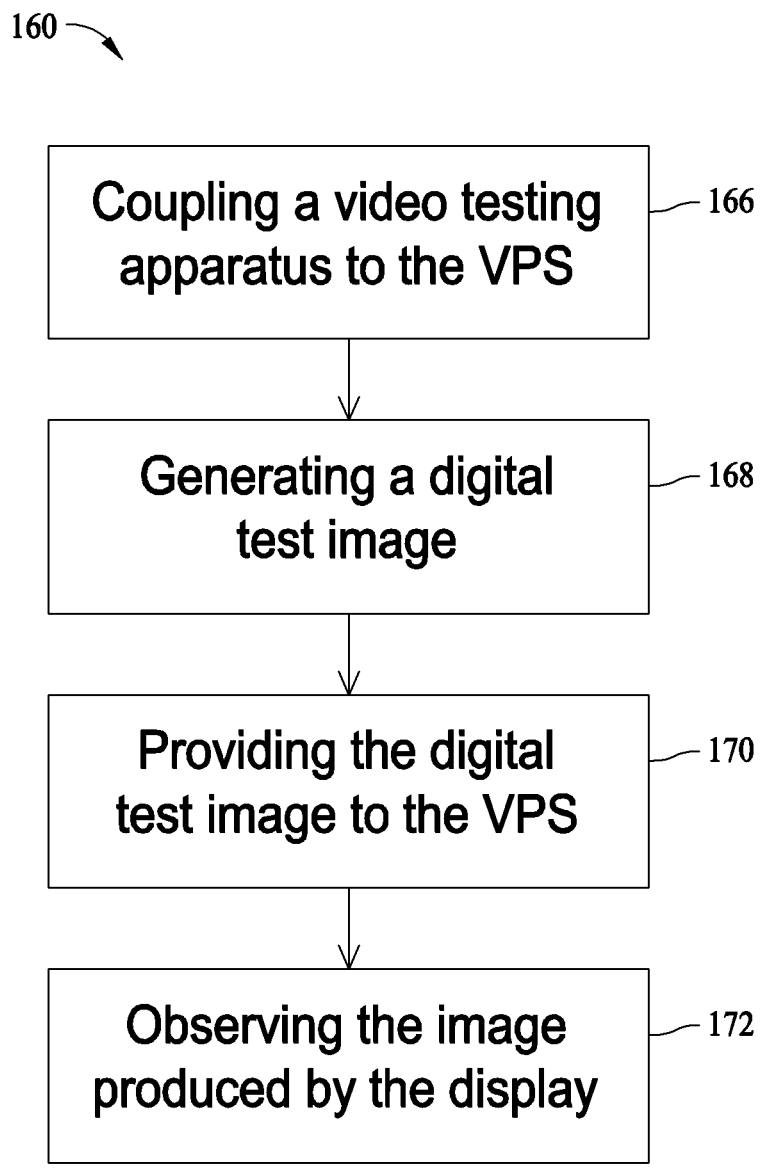
FIG. 6 is a flowchart illustrating a VPS testing process.

FIG. 6 is a flowchart illustrating an exemplary method 160 for testing VPS 26 (shown in FIG. 3). Method 160 includes coupling 166 the video testing apparatus to VPS 26 (shown in FIG. 3). More specifically, coupling 166 includes coupling digital video interface 92 and serial interface 94 (shown in FIG. 4) to VPS 26.

Method 160 also includes generating 168 a digital test image, for example, digital test image 120 (shown in FIG. 5). The digital test image is a known video pattern that corresponds to an image produced by a commercial/military quality video camera. The digital test image is provided 170 to the VPS 26. VPS 26 processes the digital test image and provides the image to a display, for example, display screen 28 (shown in FIG. 3). Method 160 also includes observing 172 the image produced by the display. A user of the video testing apparatus analyzes the images produced by the display to determine if VPS 26 is functioning as desired.

Described herein are exemplary methods and apparatus for testing the functionality of a video processing system. More specifically, the methods and apparatus described herein enable an individual to test a video processing system. Without the video testing apparatus 80 (shown in FIG. 4), such tests may require multiple people to perform. The methods and apparatus allow a user to test a video processing system, within an aircraft or not yet installed within an aircraft, and without the use of a camera system. The video testing apparatus 80 described herein is more compact than a typical camera system and therefore easier to travel with to a testing location. Video testing apparatus 80 also allows a user to isolate a problem in a malfunctioning aircraft video system. More specifically, video testing apparatus allows a user to identify a malfunction within a video processing system by removing the camera, which is another potential area that a malfunction in an aircraft video system may occur.

The methods and apparatus described herein facilitate efficient and economical testing of a video processing system. Exemplary embodiments of methods and apparatus are described and/or illustrated herein in detail. The methods and apparatus are not limited to the specific embodiments described herein, but rather, components of each apparatus, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method of testing an aircraft video system using a handheld video testing apparatus, the aircraft video system including a video processing system and at least one display, the method comprising:
   removably coupling the video testing apparatus to the aircraft video system;
   receiving, at the video testing apparatus, at least one motion command from the video processing system, for emulating camera motion;
   generating a digital test image utilizing the video testing apparatus, wherein the digital test image includes a predetermined video pattern;
   receiving the digital test image at the video processing system;
   forwarding the digital test image to at least one of the displays included in the aircraft video system through operation of the video processing system; and
   verifying the digital test image is correctly produced by the displays included in the aircraft video system to which the digital test image was forwarded.

2. A method in accordance with claim 1, wherein coupling the video testing apparatus to the video processing system comprises coupling a digital interface adapter and a serial connector to the video processing system.

3. A method in accordance with claim 1, wherein forwarding the digital test image to at least one of the displays further comprises forwarding a set of known video patterns to at least one of the displays, wherein the predetermined video pattern is included in the set of known video patterns.

4. A method in accordance with claim 1, wherein generating the digital test image further comprises generating a plurality of digital test images and providing the plurality of digital test images to the video processing system in a predetermined order.

5. A method in accordance with claim 4, wherein providing the plurality of digital test images to the video processing system further comprises configuring the plurality of digital test images to simulate camera motion.

6. A method in accordance with claim 5, further comprising verifying that the plurality of digital test images simulate camera motion in response to the at least one motion command.

7. A method in accordance with claim 1, wherein verifying the digital test image is correctly produced by the display further comprises comparing the image produced by the display to a known image to determine whether the video processing system is functional.

8. A method in accordance with claim 1, further comprising simulating camera motion by generating a plurality of shifted images from the digital test image.

9. A method in accordance with claim 1, further comprising simulating camera motion by generating a plurality of zoomed-in images from the digital test image.

10. A method in accordance with claim 1, further comprising:
   generating a shade of grey utilizing the video testing apparatus; and
   forwarding the shade of grey to at least one of the displays to be displayed in combination with the digital test image.

11. A method in accordance with claim 1, wherein the aircraft video system includes at least one camera coupled to the video processing system and the method further comprises decoupling the at least one camera from the video processing system and coupling the video testing apparatus to the video processing system in place of the at least one camera.

12. A method in accordance with claim 1, wherein the method is performed before the video processing system is installed in an aircraft.

13. A handheld video testing apparatus for testing a video processing system, wherein the video processing system is coupled to at least one display screen and facilitates display of a test image on the at least one display, said apparatus comprising:
   an interface adapter configured to facilitate removably coupling of said video testing apparatus and the video processing system; and
   a processor configured to provide a plurality of test images to said interface adapter, wherein the plurality of test images include a set of predetermined video patterns that are presentable on the at least one display of the video processing system to enable a user to determine whether the video processing system is functioning as desired and wherein said processor is further configured to receive at least one motion command from the video processing system, for emulating camera motion.

14. A handheld video testing apparatus in accordance with claim 13, wherein said processor is configured to provide a plurality of test images that emulate digital video images output by a video camera.

15. A handheld video testing apparatus in accordance with claim 13, further comprising, a plurality of input selectors coupled to said processor.

16. A handheld video testing apparatus in accordance with claim 15, wherein said plurality of input selectors are configured to enable at least one of a test start, a test re-start, a test stop, and a test image position selection.

17. A handheld video testing apparatus in accordance with claim 13, further comprising, a diagnostic port configured to facilitate programming of said processor.

18. A handheld video testing apparatus in accordance with claim 13, wherein said interface adapter is configured to match the video standard input of said video processing system.

19. A handheld video testing apparatus in accordance with claim 13 wherein said processor is further configured to provide a plurality of test images that simulate image motion to said interface adapter.

20. A handheld video testing apparatus in accordance with claim 13 wherein said processor is further configured to provide a frame counter digital signal to the video processing system.

21. A handheld video testing apparatus in accordance with claim 20 wherein said frame counter digital signal causes an individual frame number to be displayed on the at least one display screen that identifies each of said plurality of test images.

22. A handheld video testing apparatus in accordance with claim 13 further comprising a housing configured to enclose said processor and said interface adaptor, said housing having a size that allows for handheld use of said video testing apparatus.

23. A handheld video testing apparatus in accordance with claim 13, wherein said processor is further configured to provide changing shades of grey to said interface adapter in combination with the plurality of test images.

* * * * *